United States Patent
Donabedian et al.

(10) Patent No.: US 11,281,818 B2
(45) Date of Patent: Mar. 22, 2022

(54) METHOD FOR EVALUATING AN ADHESIVE FOR A VEHICULAR JOINT

(71) Applicant: Ford Motor Company, Dearborn, MI (US)

(72) Inventors: Edgar Edward Donabedian, Livonia, MI (US); Scott Christopher Sterbenz, Brownstown, MI (US); Thomas Norton, Ann Arbor, MI (US); Darrin Neil Wagner, Bloomfield Hills, MI (US); Forrest W. Eddings, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 438 days.

(21) Appl. No.: 16/288,486

(22) Filed: Feb. 28, 2019

(65) Prior Publication Data
US 2020/0279026 A1 Sep. 3, 2020

(51) Int. Cl.
*G06F 30/15* (2020.01)
*G06F 30/20* (2020.01)
*G06F 111/10* (2020.01)

(52) U.S. Cl.
CPC ............ *G06F 30/15* (2020.01); *G06F 30/20* (2020.01); *G06F 2111/10* (2020.01)

(58) Field of Classification Search
CPC .......... G06F 30/15; G06F 3/016; G06F 30/23; G06F 2111/10; A61C 7/002
See application file for complete search history.

(56) References Cited

U.S. PATENT DOCUMENTS

| | | | |
|---|---|---|---|
| 5,527,404 A * | 6/1996 | Warren | C22F 1/05 148/688 |
| 7,870,792 B2 | 1/2011 | Kubli et al. | |
| 7,988,222 B2 * | 8/2011 | Fujimoto | B60R 21/34 296/187.04 |
| 8,229,717 B2 * | 7/2012 | Riveira Rodriguez | G06F 30/23 703/6 |
| 9,307,906 B2 * | 4/2016 | Harte | A61B 5/4824 |
| 9,619,030 B2 * | 4/2017 | Ciesla | G06F 3/016 |
| 9,837,253 B2 * | 12/2017 | Rozak | C23C 14/3492 |
| 10,271,923 B2 * | 4/2019 | Kuo | A61C 7/08 |

(Continued)

FOREIGN PATENT DOCUMENTS

| | | |
|---|---|---|
| EP | 2737963 | 6/2014 |
| JP | 2005153011 | 6/2005 |

OTHER PUBLICATIONS

Govik, A., Finite Element Analysis of Sheet Metal Assemblies—Prediction of Product Performance Considering the Manufacturing Process, Linköping Studies in Science and Technology, Dissertations No. 1605, Division of Solid Mechanics, Department of Management and Engineering, Linköping University, Sweden, Jun. 2014.

*Primary Examiner* — Thai Q Phan
(74) *Attorney, Agent, or Firm* — Burris Law, PLLC

(57) ABSTRACT

The present disclosure is directed toward a method that includes simulating, by an adhesive analytic model, transformation of at least one vehicular joint joined by a selected adhesive based on one or more system variables, and outputting, by the adhesive analytic model, an adhesive analysis identifying deformation for the selected adhesive along the at least one vehicular joint based on the simulated transformation and a deformation rating scale.

18 Claims, 6 Drawing Sheets

(56) References Cited

U.S. PATENT DOCUMENTS

| | | | |
|---|---|---|---|
| 10,729,515 B2* | 8/2020 | Kuo | A61C 7/08 |
| 10,912,627 B2* | 2/2021 | Kuo | A61C 7/002 |
| 2009/0192766 A1* | 7/2009 | Rodriguez | G06F 30/23 |
| | | | 703/1 |
| 2011/0295570 A1 | 12/2011 | Zhu et al. | |
| 2012/0033851 A1* | 2/2012 | Chen | G06T 7/0002 |
| | | | 382/100 |
| 2013/0216089 A1* | 8/2013 | Chen | G06T 7/0002 |
| | | | 382/100 |
| 2017/0140080 A1 | 5/2017 | Oetjens et al. | |
| 2020/0257771 A1* | 8/2020 | Meaige | G06F 30/15 |

* cited by examiner

ADHESIVE REPORT

| Adhesive | Bead Size | Bar 1 | Bar 2 | Bar 3 | Bar 4 |
|---|---|---|---|---|---|
| ADH-1 | Large | 1 | 5 | 5 | 5 |
| ADH-1 | Small | 1 | 5 | 5 | 5 |
| ADH-1 | Medium | 1 | 3 | 4 | 4 |
| ADH-2 | Large | 1 | 4 | 4 | 3 |
| ADH-2 | Small | 1 | 4 | 2 | 3 |
| ADH-2 | Medium | 1 | 5 | 2 | 2 |

METHOD FOR EVALUATING AN ADHESIVE FOR A VEHICULAR JOINT

FIELD

The present disclosure relates to a method for evaluating adhesives used at vehicular joint.

BACKGROUND

The statements in this section merely provide background information related to the present disclosure and may not constitute prior art.

A vehicle body is typically formed of components having different material properties for meeting different structural requirements. For example, a vehicle frame is typically made of a lightweight material that is also strong for providing structural support. Other components of the vehicle body, such as panels disposed along the roof, door, and/or hood, can be made of lightweight material that are resilient, and thus, can be made of a material having different gauge than that of the frame.

To provide additional support to the panels and inhibit flutter and deflection, an adhesive material is typically disposed between the panel and the frame (i.e., support structure). The adhesive material should prevent flutter, but also inhibit distortion like dimples along the panel. Adhesive materials having varying strength are generally tested to select the optimal material for joining the panel to the structure. This process can be time consuming and expensive. These and other issues are addressed by the present disclosure.

SUMMARY

This section provides a general summary of the disclosure, and is not a comprehensive disclosure of its full scope or all of its features.

In one form, the present disclosure is directed toward a method that includes simulating, by an adhesive analytic model, transformation of at least one vehicular joint joined by a selected adhesive based on one or more system variables, and outputting, by the adhesive analytic model, an adhesive analysis identifying deformation for the selected adhesive along the at least one vehicular joint based on the simulated transformation and a deformation rating scale. The system variables relate to a vehicular structure, an adhesive property, a manufacturing condition, or a combination thereof.

In another form, the method further includes preparing a plurality of controlled plaques having different levels of deformation, defining the deformation rating scale based on the controlled plaques and a deformation measurement standard, and generating the adhesive analytic model to simulate the transformation of a given joint and to assign the deformation score to the selected adhesive based on the transformation and the deformation rating scale. The deformation rating scale associates a deformation amount with a deformation score.

In yet another form, the levels of deformation provided in the plurality of controlled plaques replicate deformations associated with the deformation measurement standard.

In one form, the defining the deformation rating scale further includes associating the deformation score to a given controlled plaque based on the level of deformation and a panel type. The panel type indicates whether the level of deformation is for a flat surface of a curved surface.

In another form, the deformation rating scale associates a numerical value to different levels of deformation, and the levels of deformation are based on amount of deformation perceptible at varying sight angles, lighting conditions, or a combination thereof.

In yet another form, for the system variables: the vehicle structure includes, for a vehicle, one or more part materials, one or more part gauges, a vehicle geometry, a part stiffness, a location along the vehicle, a bond-gap, or combination thereof; the adhesive property includes, for a given adhesive, a stiffness characteristic, a curing property, an expansion rate, a volume, or a combination thereof; and the manufacturing condition includes a build tolerance, an oven profile, a hydrostatic pressure, a deckling load, or a combination thereof.

In one form, the method further includes determining a deformation amount of the joint based on the simulated transformation of the joint, and assigning a deformation score to the selected adhesive based on the deformation amount and the deformation rating scale.

In another form, the selected adhesive is selected from among a plurality of adhesives, and the outputted adhesive analysis includes an adhesive report that identifies at least one selected adhesive from among the plurality of adhesives and provides a deformation score for the at least one selected adhesive.

In yet another form, the outputted adhesive analysis includes a stress analysis model that depicts stresses along the at least one vehicular joint for the selected adhesive.

In one form, the present disclosure is directed toward a method that includes preparing a plurality of controlled plaques having different levels of deformation, and defining a deformation rating scale based on the controlled plaques and a deformation measurement standard, where the deformation rating scale associates a deformation of a given controlled plaque with a deformation score. The method further includes simulating, by an adhesive analytic model, transformation of at least one vehicular joint joined by a selected adhesive based on one or more system variables, determining, by the adhesive analytic model, a deformation amount of the at least one vehicular joint based on the simulated transformation, and outputting, by the adhesive analytic model, an adhesive analysis for the selected adhesive based on the deformation amount and the deformation rating scale.

In another form, the system variables relate to a vehicular structure, an adhesive property, a manufacturing condition, or a combination thereof. In one variation, the system variables: the vehicle structure includes, for a vehicle, one or more part materials, one or more part gauges, a vehicle geometry, a part stiffness, a location along the vehicle, a bond-gap, or combination thereof; the adhesive property includes, for a given adhesive, a stiffness characteristic, a curing property, an expansion rate, a volume, or a combination thereof; and the manufacturing condition includes a build tolerance, an oven profile, a hydrostatic pressure, a deckling load, or a combination thereof.

In yet another form, the deformation measurement standard includes a laser scanning measurement, a visual inspection measurement, or both the laser scanning measurement and the visual inspection measurement.

In one form, the present disclosure is directed toward, a method that includes preparing a plurality of controlled plaques having different levels of deformation, defining a deformation rating scale based on the controlled plaques and a deformation measurement standard, where the deformation rating scale associates a deformation of a given controlled plaque with a deformation score. The method further includes generating an adhesive analytic model to simulate transformation of at least one vehicular joint joined by a selected adhesive based on one or more system variables and to determine a deformation amount of the at least one vehicular joint based on the transformation and the deformation rating scale. The system variables relate to a vehicular structure, an adhesive property, a manufacturing condition, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is an example adhesive report outputted by the adhesive analytic model in accordance with the teachings of the present disclosure;

FIG. 8 is a flowchart of an example adhesive analytic routine in accordance with the teachings of the present disclosure.

Figure 1A:
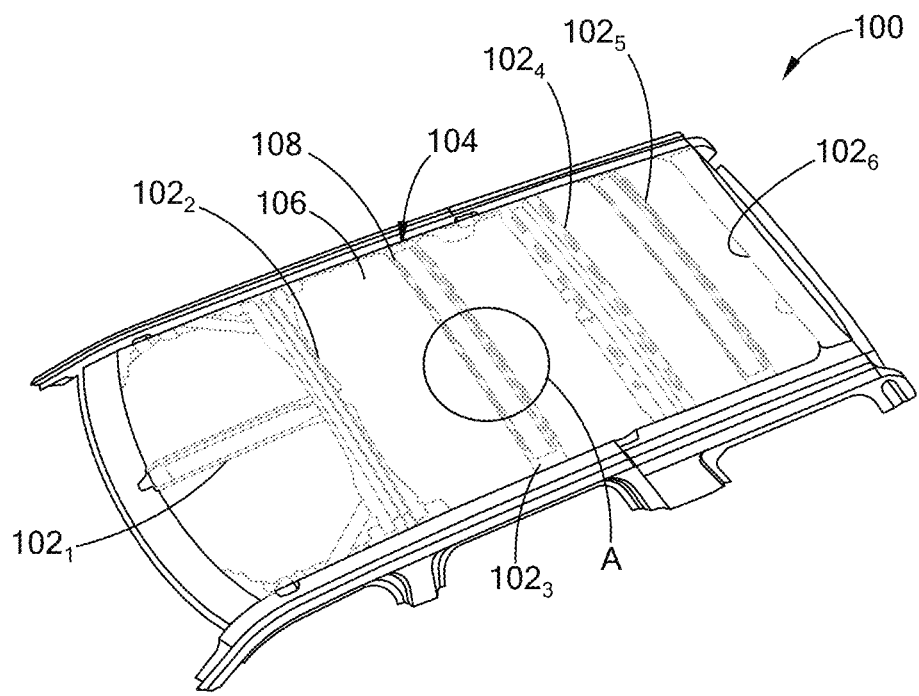
FIG. 1A illustrates a roof having a panel and a frame joined by an adhesive.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
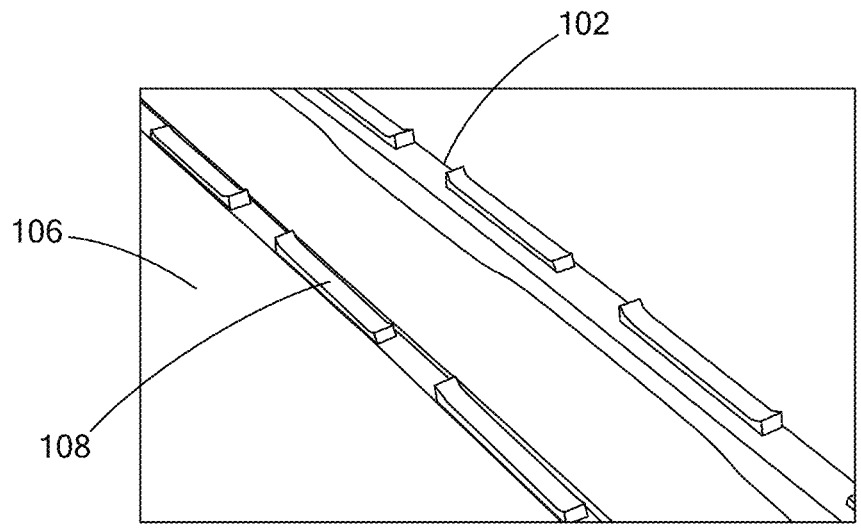
FIG. 1B is an enlarged view of the roof at area A.

A vehicle body is typically formed of different material for minimizing vehicle weight and promoting structural strength. For example, referring to FIGS. 1A and 1B, a roof 100 typically includes multiple bars $102_1$ to $102_6$ (collectively as bars 102) that are arranged to define a roof frame 104. The bars 102 are formed of a light-weight, but strong material such as high strength steel or other suitable material. The roof 100 also includes a panel 106 disposed over the roof frame 104. The panel 106 is typically a made of a material that is thinner than the bars 102, such as steel, aluminum, or other suitable material. The roof frame 104 is one example of a structural component and the panel 106 is one example of a resilient component. It should be readily understood that the teachings of the present disclosure are applicable to other suitable structural components and resilient components provided along the vehicle and should not be limited to the roof.

The panel 106 is connected to the frame 104 via an adhesive 108 deposited along a surface of the room frame 104 to form a joint with the panel 106. In one form, the material property of the adhesive 108 (e.g., Young modulus, "modulus" hereinafter) is stiff enough to prevent the panel 106 from deflecting (i.e., fluttering), but yielding to inhibit read-through or in other words, deformation, such as dimples, along the panel 106.

Figure 2:
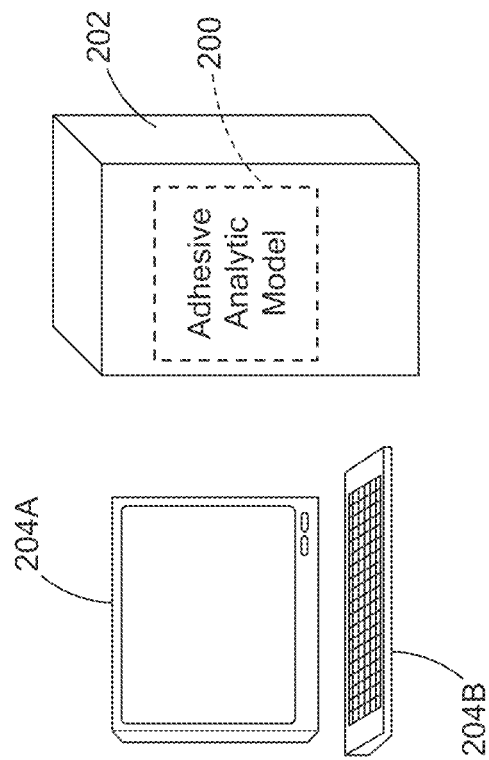
FIG. 2 illustrates a computing device having an adhesive analytic model in accordance with the teachings of the present disclosure.
Figure 3:
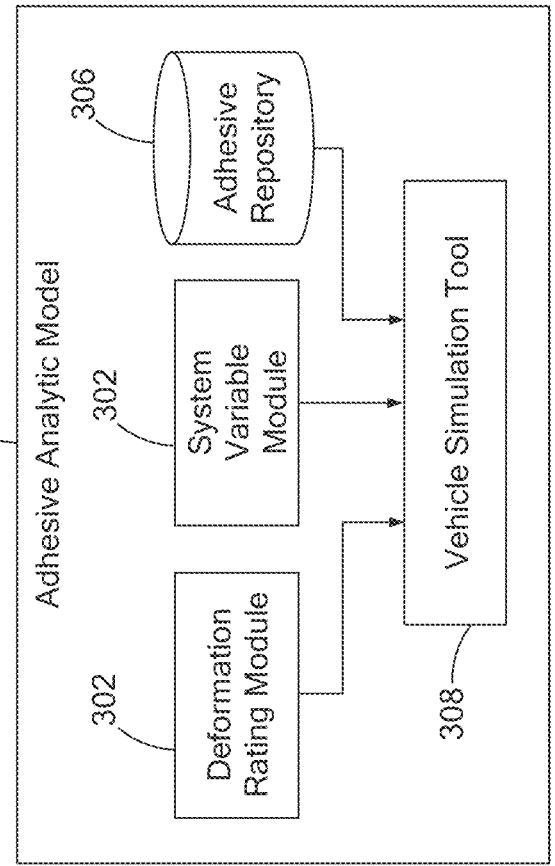
FIG. 3 is a block diagram of the adhesive analytic model in accordance with the teachings of the present disclosure.

Referring to FIGS. 2 and 3, an adhesive analytical model 200 of the present disclosure is operable to select one or more adhesives 108 for securing the structural component (e.g., roof frame) to the resilient component (e.g., panel). In one form, the adhesive analytical model 200 is generated using a computer-assisted-engineering (CAE) tool (e.g., LS-DYNA®), and is provided as a software tool defined by computer executable instructions. In one form, the adhesive analytical model 200 resides in a computer 202 having a processor, memory, and other suitable components for executing the adhesive analytical model 200. Alternatively, the adhesive analytical model 200 may reside in a server accessible by a computing device, such as a computer or laptop, via a communication network. A user may access the adhesive analytical model 200 using one or more user interfaces (e.g., monitor 204A and keyboard 204B) that are communicably coupled to the computer 202 via a wireless communication link (e.g., BLUETOOTH), and/or wired link (e.g., a cable). The adhesive analytical model 200 is configured to display one or more graphical user interfaces for communicating with the user.

In one form, the adhesive analytical model 200 includes a deformation rating module 302, a system variable module 304, an adhesive repository 306, and a vehicle simulation tool 308. The deformation module 302 defines a deformation rating scale that associates a numerical value to different levels of deformation formable on the resilient component. As described further herein, the deformation rating scale is predetermined using controlled samples having varying levels of deformation. In one form. the levels of deformation are based on the amount of deformation perceptible at varying sight angles, lighting conditions, or a combination thereof. For example, table 1 provided below illustrates one example of a deformation rating scale that assigns a numerical value (1 to 5) to 5 different levels of deformation. The deformation rating scale may include any number of levels and should not be limited to example of Table 1.

TABLE 1

Deformation Rating Scale

| Rating | Deformation Level |
|---|---|
| 1 | No deformation visible. |
| 2 | Deformation perceptible at one sight angle and/or under one lighting condition. |
| 3 | Deformations perceptible at a few sight angles and/or lighting conditions, but acceptable. |
| 4 | Deformations perceptible at most sight angles and lighting conditions. |
| 5 | Deformations perceptible at all sight angles and lighting conditions. |

The system variable module 302 acquires inputs associated with one or more system variables from a user via the user interfaces 204. The system variables are pre-determined factors that influence transformation of a joint having a selected adhesive, and can include factors related, but not limited to: the adhesive, vehicle design, and/or manufacturing factors. Specifically, with regard to the adhesive, variables may include: the Young modulus, cure behavior, expansion rate, and/or volume. With regard to the vehicle design, the variables may include: part material, part gauge, section/geometry, stiffening features, location on vehicle, and/or bond gap. With regard to manufacturing, the variables may include: build tolerance, oven profile, hydrostatic pressures, and/or decking loads. While specific variables are provided, other system variables that may contribute to deformation and may also be considered while remaining within the scope of the present disclosure.

The adhesive repository 306 stores information, such as chemical and mechanical properties, for different types of adhesives available for joining components along the vehicle. In one form, the user may select one or more adhesives to be evaluated as part of the system variables, and the adhesive repository 306 stores the properties of the adhesives, which is used by the vehicle simulation tool 308 for assessing whether the selected adhesive causes deformation. In another form, the adhesive analytic model 200 may not include the adhesive repository, and instead requests adhesive information from the user.

In one form, the vehicle simulation tool 308 is configured to predict possible deformation of the resilient component joined to the structural component based on a selected adhesive, the system variables, and the deformation rating scale. More particularly, the vehicle simulation tool 308 simulates possible transformation along the joint(s) connecting the resilient component and structural component due to, for example, thermal expansion and induced stresses. The transformation of the joints can be provided as movement of the resilient component, the structural component, the adhesive, or a combination thereof. Based on the simulated transformation, the vehicle simulation tool 308 further determines a deformation amount along the resilient member having a selected adhesive, and assigns a deformation score to the selected adhesive based on the information in the deformation rating module.

Figure 5:
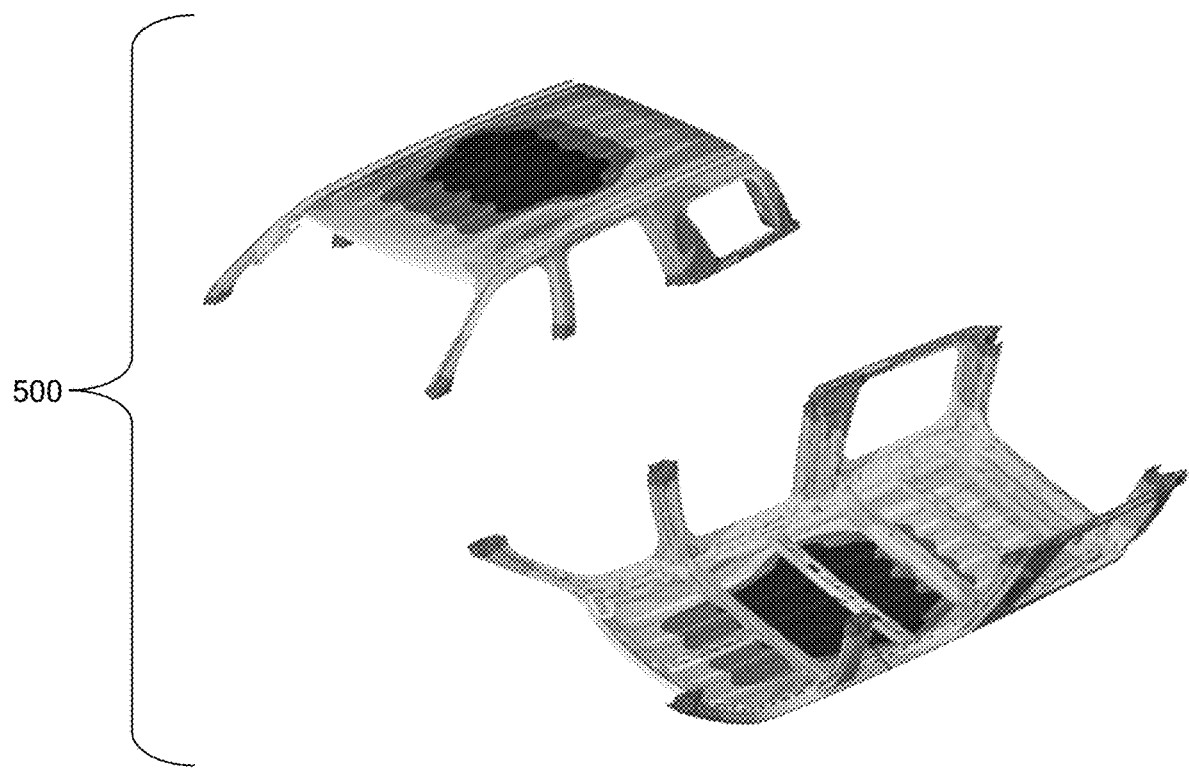
FIG. 5 is an example stress analysis model outputted by the adhesive analytic model in accordance with the teachings of the present disclosure.

In one form, the vehicle simulation tool 308 may output an adhesive analysis, such as an adhesive report that identifies at least one selected adhesive from among a plurality of adhesives provided in the adhesive repository and provides a deformation score for each of the selected adhesives for one or more joints. For example, FIG. 4 illustrates an example adhesive report 400 for the roof of FIG. 1. The report 400 provides the type of adhesive selected (e.g., ADH-1 and ADH-2), the bead size for the adhesive (e.g., small, medium, large), the joint being analyzed (e.g., joint along Bar 1, Bar 2, Bar 3, and Bar 4), and the deformation score for each combination of adhesive and joint (e.g., score between 1 to 5). Based on the report 400, it is apparent that a single adhesive cross the entire panel 106 would not be possible because of the high rating (i.e., score 4 and 5) at Bar 2, which indicates deformations perceptible at most/all sight angles. Accordingly, the vehicle simulation tool 308 provides guidance on the type of adhesive to use for the various joints of along the vehicle, and thus reducing high cost experimentation using actual parts. The vehicle simulation tool 308 may be configured to generate other types of adhesive analysis, and should not be limited to the report of FIG. 4. For example, referring to FIG. 5, the vehicle simulation tool 308 may generate a stress analysis model 500 for depicting the stresses along the roof 100.

Figure 6:
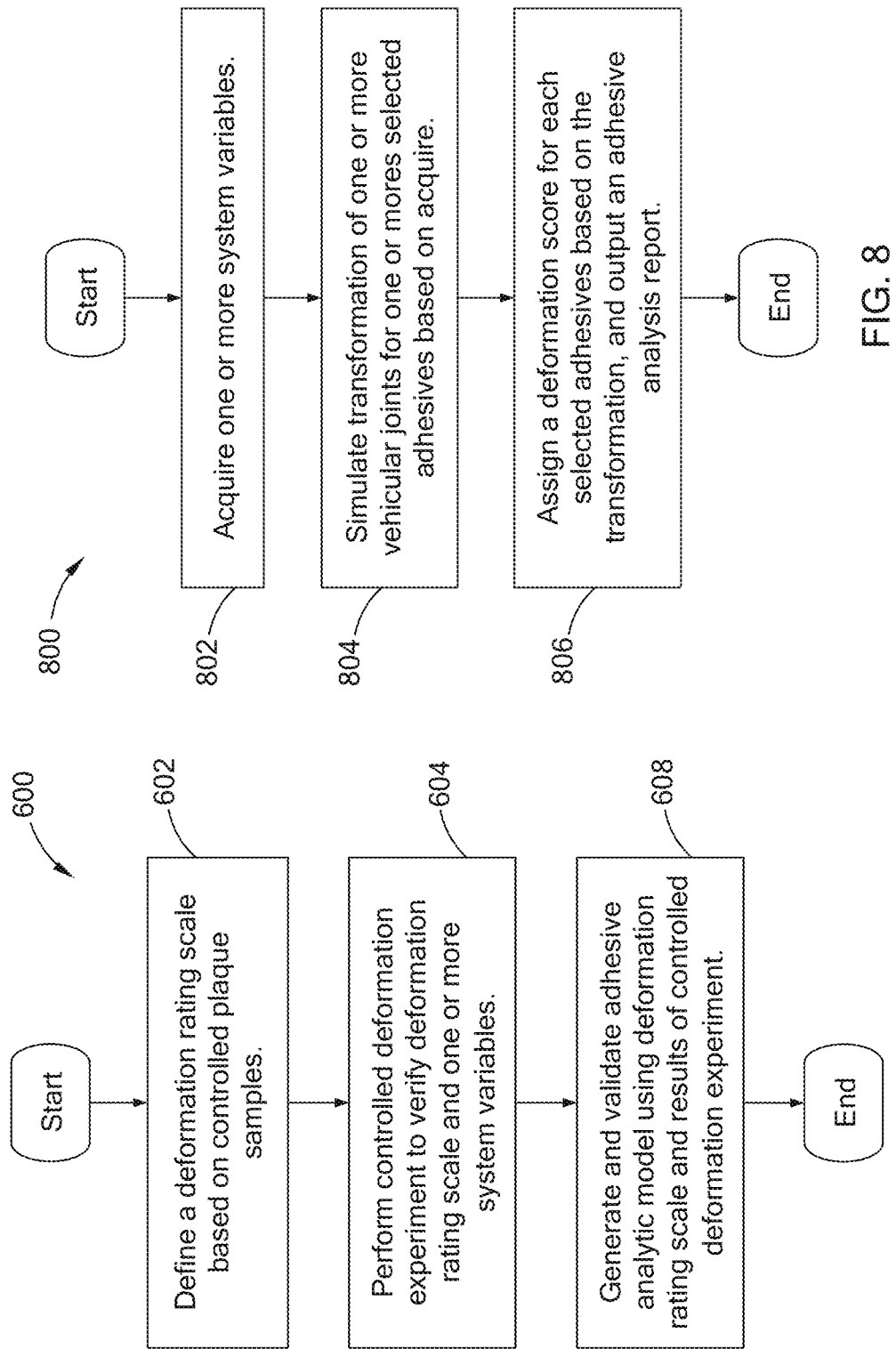
FIG. 6 is a flowchart of an adhesive model formation routine in accordance with the teachings of the present disclosure.
Figure 7:
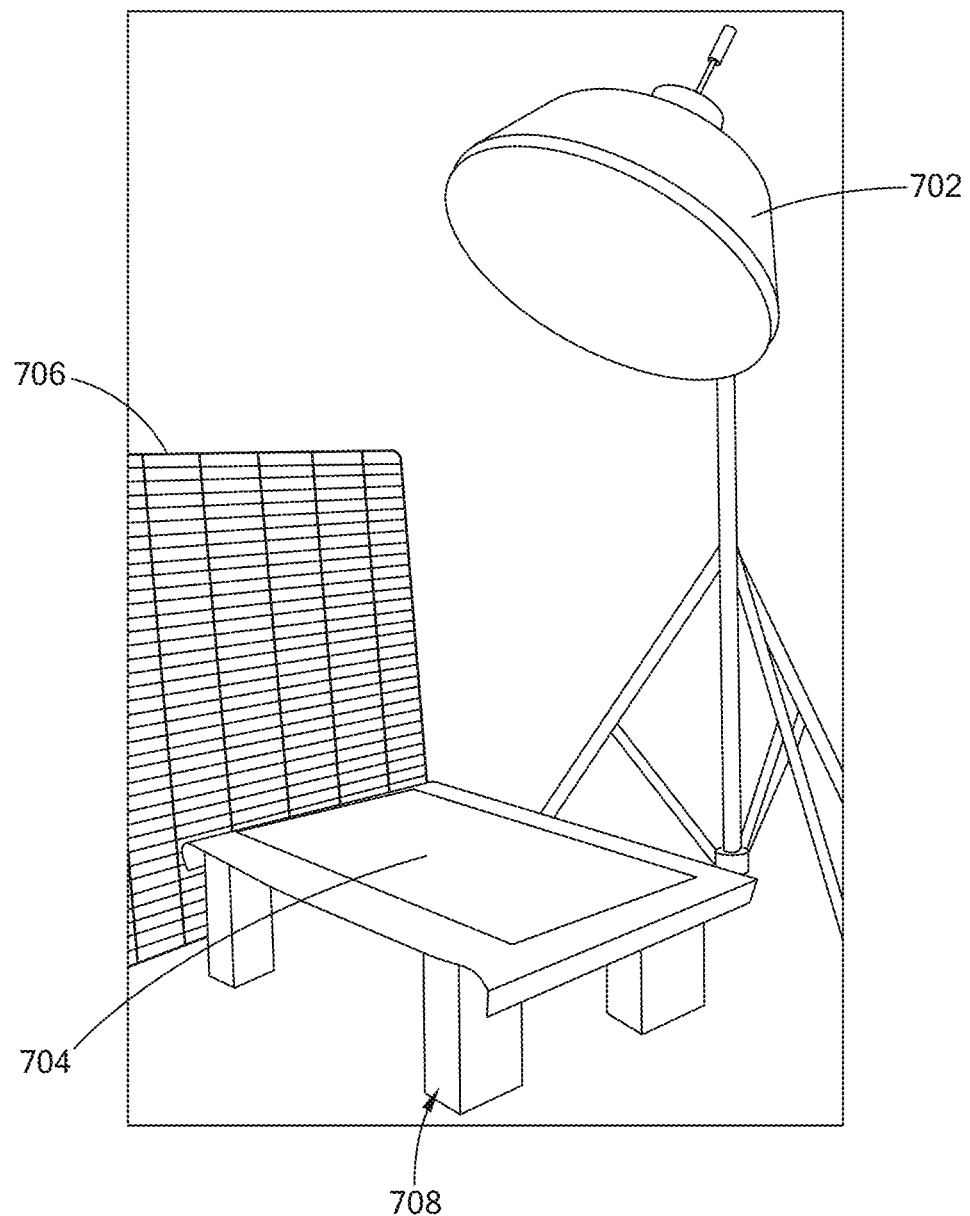
FIG. 7 illustrates an example plaque evaluation set-up in accordance with the teachings of the present disclosure.

Referring to FIG. 6, an adhesive model formation routine 600 for generating the adhesive analytical model is provided. At 602, a deformation rating scale is defined using controlled plaque samples. More particularly, in one form, multiple plaques having different levels of deformation are prepared using a reflective material, such as steel that is painted or other suitable material. In one form, the plaques are panels that have flat surfaces, curved surfaces, or a combination thereof. Each plaque is evaluated using a deformation measurement standard that is based on amount of deformation perceptible at varying sight angles, lighting conditions, or a combination thereof. For example, one deformation measurement standard includes laser scanning the plaques to detect the amount of deformation along the plaques. Another deformation measurement standard includes a visual inspection of the plaques by a technician. For example, FIG. 7 illustrates an example plaque evaluation set-up having a light source 702, such as a lamp, a plaque sample 704, and a grid panel 706. The plaque 704 is disposed on platform 708 next to the grid panel 706, such that an image of the grid panel 706 is reflected on the plaque 704. The light source 702 is positioned above the plaque 704 and is moveable. The technician analyzes the plaque 704 to identify portions of the grid panel 706 that appear distorted, which is indicative of deformation. Both the laser scanning and visual inspection asses the quality of the plaques based on the amount of deformation detected, which is provided as the rate of change along the plaque.

In addition, assessing deformation for a flat plaque is different than a curved plaque due to the structured bend of the curved panel. Specifically, a distortion along the surface of a curved resilient component may not be caused by a deformation/dimple of the component, but by the general curvature of the curved portion of the resilient component. Accordingly, the rate of change for an acceptable plaque is higher for a curved plaque than a flat plaque.

In one form, the plaques are evaluated using both the laser scanning and visual inspection measurement standards. The evaluation of the standards are statistically correlated and used to create a deformation rating scale, such as the one provided in Table 1 above. The plaques are then assigned a deformation score, and can be used as samples for assessing deformation.

Referring back to FIG. 6, after defining the deformation rating scale, the adhesive model formation routine 600 verifies deformation and the accuracy of the deformation rating scale via a controlled experiment, at 604. More particularly, in one form, a controlled vehicular experiment is performed to validate the deformation rating scale and determine the effect preidentified system variables have on a joint joining the structural component and the resilient component. In one form, multiple test vehicles are constructed with different design specifications. For example, multiple test vehicles having the roof 100 of FIG. 1 are constructed using different adhesives, bead sizes, design tolerances, and manufacturing conditions. The test vehicles are then evaluated for deformation at one or more resilient components being tested. That is, the test vehicles can be constructed to assess deformation at more than one resilient component along the vehicle, such as the panel(s) along the door, roof, hood, and/or trunk. Using the deformation measurement standards described above and the deformation rating scale, a deformation score is assigned to the adhesive used for a particular joint. For the joints having unacceptable read-through, a follow-up test can be performed to find an acceptable adhesive material.

At 606, an adhesive analytic model is generated using a CAE software tool, and the model is verified based on the controlled vehicular experiment performed at 604. As described above, the adhesive analytic model simulates transformation at joints along the vehicle based on system variables, and assigns a deformation score using the deformation rating scale defined at 602. In one form, by modifying the system variable inputs based on the design specifications of the test vehicles, the results from the experiments can be used to refined and validate the accuracy of the adhesive analytical model.

Referring to FIG. 8, an example adhesive analytic routine 900 for evaluating an adhesive via the adhesive analytic model is provided. This routine is executed based on a command from the user. At 802, the model acquires one or more system variables, which can be entered by the user. At 804, the model simulates transformation of one or more vehicular joints for one or more selected adhesives based on the acquired variables. At 806, the model assigns a deformation score for each selected adhesives based on the transformation, and outputs an adhesive analysis. In one form, the model determines the amount of deformation (i.e., rate of change) at the one or more vehicular joints based on the simulation, and assigns the deformation score to selected adhesive based on the deformation amount. The model may then outputs an adhesive analysis, such as the adhesive report and/or the stress analysis model The adhesive analytic model of the present disclosure analyzes adhesives for joining components along the vehicle body using a deformation rating scale that quantifies deformation levels. The adhesive analytic model reduces the need of physical test parts and improves deformation measurement standards by providing an objective standard.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   simulating, by an adhesive analytic model, transformation of at least one vehicular joint joined by a selected adhesive to determine a deformation amount based on one or more system variables, wherein the adhesive analytic model stores information related to a plurality of available adhesives, the selected adhesive is selected from among the plurality of available adhesives, wherein the system variables relate to a vehicular structure, an adhesive property, a manufacturing condition, or a combination thereof; and
   outputting, by the adhesive analytic model, an adhesive analysis identifying deformation for the selected adhesive along the at least one vehicular joint based on the simulated transformation and a deformation rating scale, wherein:
   the deformation rating scale associates a deformation amount with a deformation score, and
   the deformation rating scale associates a numerical value to different levels of deformation, the levels of deformation are based on amount of deformation perceptible at varying sight angles, lighting conditions, or a combination thereof.

2. The method of claim 1 further comprising:
   preparing a plurality of controlled plaques having different levels of deformation;
   defining the deformation rating scale based on the controlled plaques and a deformation measurement standard; and
   generating the adhesive analytic model to simulate the transformation of a given joint and to assign the deformation score to the selected adhesive based on the transformation and the deformation rating scale.

3. The method of claim 2, wherein the levels of deformation provided in the plurality of controlled plaques replicate deformations associated with the deformation measurement standard.

4. The method of claim 2, wherein the defining the deformation rating scale further comprises associating the deformation score to a given controlled plaque based on the level of deformation and a panel type, wherein the panel type indicates whether the level of deformation is for a flat surface of a curved surface.

5. The method of claim 1, wherein, for the system variables,
   the vehicular structure includes, for a vehicle, one or more part materials, one or more part gauges, a vehicle geometry, a part stiffness, a location along the vehicle, a bond-gap, or combination thereof,
   the adhesive property includes, for a given adhesive, a stiffness characteristic, a curing property, an expansion rate, a volume, or a combination thereof, and
   the manufacturing condition includes a build tolerance, an oven profile, a hydrostatic pressure, a deckling load, or a combination thereof.

6. The method of claim 1 further comprising:
   determining the deformation amount of the joint based on the simulated transformation of the joint; and
   assigning a deformation score to the selected adhesive based on the deformation amount and the deformation rating scale.

7. The method of claim 1, wherein the outputted adhesive analysis includes an adhesive report that identifies at least one selected adhesive from among the plurality of adhesives and provides a deformation score for the at least one selected adhesive.

8. The method of claim 1, wherein the outputted adhesive analysis includes a stress analysis model that depicts stresses along the at least one vehicular joint for the selected adhesive.

9. A method comprising:
   preparing a plurality of controlled plaques having different levels of deformation, wherein the levels of deformation are based on amount of deformation perceptible at varying sight angles, lighting conditions, or a combination thereof;
   defining a deformation rating scale based on the controlled plaques and a deformation measurement standard, wherein the deformation rating scale associates a deformation of a given controlled plaque with a deformation score, wherein the deformation score is a numerical value;

simulating, by an adhesive analytic model, transformation of at least one vehicular joint joined by a selected adhesive based on one or more system variables;

determining, by the adhesive analytic model, a deformation amount of the at least one vehicular joint based on the simulated transformation; and outputting, by the adhesive analytic model, an adhesive analysis for the selected adhesive based on the deformation amount and the deformation rating scale.

10. The method of claim 9, wherein the levels of deformation provided in the plurality of controlled plaques replicate deformations associated with the deformation measurement standard.

11. The method of claim 9, wherein the system variables relate to a vehicular structure, an adhesive property, a manufacturing condition, or a combination thereof.

12. The method of claim 11, wherein, for the system variables, the vehicular structure includes, for a vehicle, one or more part materials, one or more part gauges, a vehicle geometry, a part stiffness, a location along the vehicle, a bond-gap, or combination thereof, the adhesive property includes, for a given adhesive, a stiffness characteristic, a curing property, an expansion rate, a volume, or a combination thereof, and the manufacturing condition includes a build tolerance, an oven profile, a hydrostatic pressure, a deckling load, or a combination thereof.

13. The method of claim 9, wherein the selected adhesive is selected from among a plurality of adhesives, and the outputted adhesive analysis includes an adhesive report that identifies at least one selected adhesive from among the plurality of adhesives and provides a deformation score for the at least one selected adhesive.

14. The method of claim 9, wherein the outputted adhesive analysis includes a stress analysis model that depicts stresses along the at least one vehicular joint for the selected adhesive.

15. The method of claim 9, wherein the defining the deformation rating scale further comprises associating the deformation score to a given controlled plaque based on the level of deformation and a panel type, wherein the panel type indicates whether the level of deformation is for a flat surface or a curved surface.

16. The method of claim 9, wherein the deformation measurement standard includes a laser scanning measurement, a visual inspection measurement, or both the laser scanning measurement and the visual inspection measurement.

17. A method comprising:

preparing a plurality of controlled plaques having different levels of deformation, wherein the levels of deformation are based on amount of deformation perceptible at varying sight angles, lighting conditions, or a combination thereof;

defining a deformation rating scale based on the controlled plaques and a deformation measurement standard, wherein the deformation rating scale associates a deformation of a given controlled plaque with a deformation score, wherein the deformation score is a numerical value; and generating an adhesive analytic model to simulate transformation of at least one vehicular joint joined by a selected adhesive based on one or more system variables and to determine a deformation amount of the at least one vehicular joint based on the transformation and the deformation rating scale, wherein the system variables relate to a vehicular structure, an adhesive property, a manufacturing condition, or a combination thereof.

18. The method of claim 17, wherein for the system variables:

the vehicular structure includes, for a vehicle, one or more part materials, one or more part gauges, a vehicle geometry, a part stiffness, a location along the vehicle, a bond-gap, or combination thereof, the adhesive property includes, for a given adhesive, a stiffness characteristic, a curing property, an expansion rate, a volume, or a combination thereof, and the manufacturing condition includes a build tolerance, an oven profile, a hydrostatic pressure, a deckling load, or a combination thereof.

* * * * *